Dec. 16, 1958

J. H. POWERS 2,864,460

ELECTRODE ARRANGEMENT FOR ELECTROSTATIC GAS FILTER

Filed Jan. 10, 1957

INVENTOR.
JAMES H. POWERS

BY *Ferd L. Mehlhoff*

HIS ATTORNEY

Dec. 16, 1958  J. H. POWERS  2,864,460
ELECTRODE ARRANGEMENT FOR ELECTROSTATIC GAS FILTER
Filed Jan. 10, 1957  2 Sheets-Sheet 2

*INVENTOR.*
JAMES H POWERS
BY
HIS ATTORNEY

United States Patent Office

2,864,460
Patented Dec. 16, 1958

2,864,460

ELECTRODE ARRANGEMENT FOR ELECTROSTATIC GAS FILTER

James H. Powers, Middletown, Ky., assignor to General Electric Company, a corporation of New York Application January 10, 1957, Serial No. 633,499

4 Claims. (Cl. 183—7)

The present invention relates to an electrostatic gas filter and more particularly to the electrode construction within the electrostatic filter for inducing an electrostatic charge upon the filter media of the electrostatic filter.

In an electrostatic filter of the type illustrated in my application S. N. 534,250, filed September 15, 1955, now Patent No. 2,814,355, and assigned to the same assignee as the present application, the adjacent pleats of an accordion folded dielectric filter media, disposed across the path of a gas stream, have electrostatic charges of opposite polarities or of different magnitudes induced thereon. A plurality of parallel electrodes on the downstream side of the filter media and disposed closely adjacent each of the upstream ridges thereof, are connected to sources of electrical potential and induce electrostatic charges of opposite polarity or different magnitude upon adjacent pleats of the filter media. Alternate electrodes are connected to a source of high D. C. electrical potential and the intermediate electrodes are connected to ground potential. The electrodes create an electrical field, the maximum intensity of which is in the plane of the electrodes or approximately in the plane of the upstream ridges of the filter media.

A particle carried by the air stream into the electrical field between adjacent pleats of the filter media becomes electrostatically charged and is repelled or attracted to one side or the other of the filter media. The charged particle is thereby attracted alternately back and forth across the area between adjacent pleats until it becomes imbedded within the fibers of the filter media. Thus, the particle is influenced by a force which opposes that of the air stream and which reduces the possibility that the particle may be carried through the filter media without becoming trapped therein. This type of filter is especially effective in removing from a gas stream a substantial percentage of the particles having a diameter of one micron size or smaller, substantially all of which normally pass through the spaces between the fibers of an uncharged filter media.

In the above type of filter, with the electrodes arranged closely adjacent the upstream ridges of the filter media, the intensity of the electrical field is greatest in the plane of the electrodes and it is this high intensity field which induces a charge upon particles entering therein and which provides the force influencing the particles after they obtain a charge upon contact with the filter media. Particles traveling at the relatively high velocity of the gas stream are subjected to this electrical field in the plane of the electrodes for only a very short duration. It has been found that the efficiency of the filter for removing these very small particles (of one micron size or smaller) can be greatly increased by increasing the time of exposure of these particles to the high intensity field.

Accordingly, it is an object of the present invention to provide an improved and more efficient electrostatic filter in which the particles are exposed to a high intensity electrical field for a greater duration of time than is provided in known arrangements after entering therein.

It is another object of the present invention to provide an improved electrostatic filter in which the intensity of the electrical field between adjacent pleats of an accordion folded filter media is substantially as high for a distance downstream on the filter as it is in the plane of the upstream facing ridges of the filter media.

It is another object of the present invention to provide an improved electrode construction for inducing an electrostatic charge of substantially uniform intensity down a portion of the length of the individual pleats.

It is a further object of the present invention to provide an electrode construction which not only induces an electrostatic charge of high and substantially uniform intensity down a portion of the individual pleats of the filter media but also prevents the collapse of the individual pleats due to the pressure of the air stream.

It is also an object of the present invention to provide an electrode construction which induces an electrostatic charge of substantially uniform intensity along a portion of the individual pleats of the filter media and which permits the utilization of the greatest possible potential difference between adjacent electrodes without electrical discharge therebetween.

Further objects and advantages of the invention will become apparent as the following description proceeds, and the features of novelty which characterize the invention will be pointed out with particularity in the claims annexed to and forming a part of this specification.

In accordance with the present invention, there is provided an electrostatic filter for filtering particles from a gas stream comprising accordion-folded filter media of dielectric fibrous material extending across the path of the gas stream and a plurality of electrodes arranged on the downstream side of the filter media with each of the upstream facing or pointing pleats of the filter media substantially encompassing an electrode. The electrodes within adjacent upstream facing pleats are charged to different potentials thereby creating an electrostatic field between adjacent upstream pleats of the filter media. The individual electrodes are formed from a plurality of electrically connected conducting elements arranged within each upstream pleat of the filter media. One of the elements is disposed closely adjacent and parallel to the upstream ridge of the pleat and the other elements are spaced therefrom and disposed within the pleat downstream from the first element. All the electrode elements within each of the individual pleats are charged to the same potential thereby establishing and maintaining an electrostatic potential of substantially uniform intensity down the portion of the filter media pleat adjacent the electrode elements.

In one embodiment of the invention, the electrodes are constructed of a plurality of electrically connected parallel elements spaced in triangular fashion within the individual pleats of the filter media. One of the elements, at the apex of the triangle, is disposed adjacent the upstream ridge of the pleat and the remaining elements are arranged downstream therefrom and spaced closely adjacent opposite sides of the individual pleats. Thus, the charging elements lie close to a plurality of points adjacent the sides of the individual pleats thereby inducing a high intensity electrostatic charge thereon and also providing reinforcement for the sides of the individual pleats against the pressure of the air stream flowing therethrough.

For a better understanding of the invention, reference may be had to the accompanying drawings in which.

Figure 1:
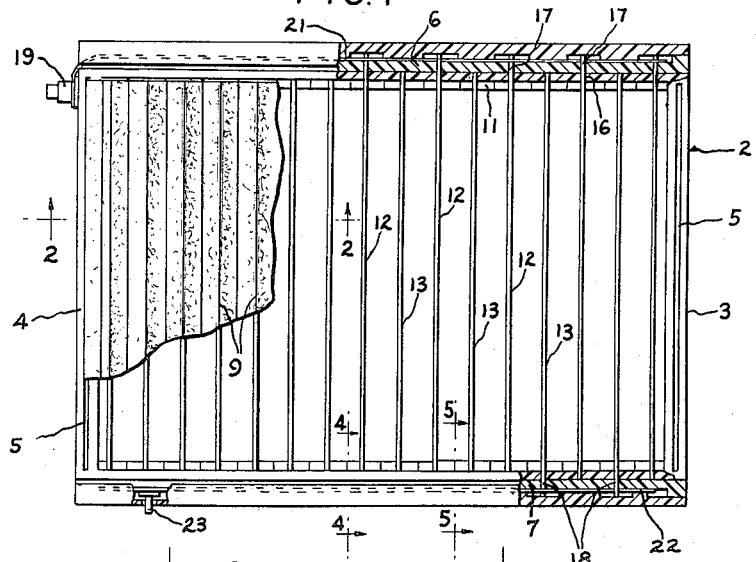
Fig. 1 is a plan view of the present invention with portions of the filter media broken away to show the remaining structure of the filter.
Figure 2:
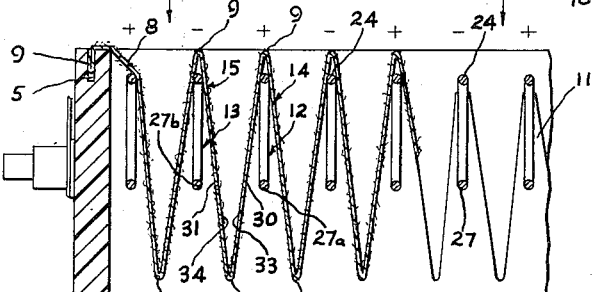
Fig. 2 is a partial elevation view taken along the line 2—2 of Fig. 1 and shows the arrangement of the filter media and the electrode construction within the frame member.

In Figs. 1 and 2 of the drawing there is shown an electrostatic gas filter comprising an insulating frame member 2 having ends 3 and 4 and opposed side walls 6 and 7. The side walls 6 and 7 support the ends of a plurality of electrodes arranged in parallel, spaced relationship across the frame member. A dielectric filter media 8 comprising one or more sheets of fibrous material folded into an accordion or zig-zag fold and having alternately facing upstream and downstream ridges 9 and 10, respectively, is at least partially supported by the electrodes and is arranged to fill the internal area within the frame member 2. The ends 9 of the filter sheet are anchored by insertion into suitable slots 5 in the ends 3 and 4 of the frame member. The side edges of the filter media are supported by a plurality of triangularly-shaped projections 11, shown more clearly in Fig. 8, formed upon the side walls 6 and 7. In Fig. 1, it will be seen that the filter media entirely overlies the electrodes which are disposed across the frame member 2. As may be seen by the arrows in Fig. 2 which represent the direction of air flow through the filter, the electrodes are on the downstream side of the filter media 8 during the operation of the filter and are substantially encompassed by the pleats of the filter media.

The electrode arrangement comprises a first series of electrodes 12 and a second series of electrodes 13 which, in operation of the filter, are maintained at different potentials or opposite polarities. For example, one set or series of electrodes such as electrodes 12 are charged with a high voltage while the other set 13 is grounded, as is illustrated by the plus or high potential electrodes and the negative or ground electrodes respectively, in Fig. 2. By this arrangement, in which the adjacent electrodes are at different electrical potentials, an electrical field is created between adjacent electrodes which has its highest intensity in the area directly therebetween. The pleats enclosing the electrode members referred to in the specification and claims as "the upstream facing pleats" comprise the upstream ridges 9 and those portions or sides of the filter media connecting thereto and diverging in the downstream direction. Thus an "upstream facing pleat" consists of all of the filter media included between two adjacent downstream ridges 10. For example, in Fig. 2 the upstream facing pleat 14, encompassing the high voltage electrode 12, includes all of the filter media 8 connecting with the upstream ridge 9 and diverging therefrom in the downstream direction to the adjacent downstream ridges 10. Similarly, in Fig. 2, the upstream facing pleat 15 includes all of the filter media 8 between adjacent downstream ridges 10 and which substantially encloses the low voltage electrode 13.

Because of the electrical field established between adjacent electrodes, each pleat of the filter media 8 has an electrostatic charge induced thereon. The polarity of the charge induced upon the pleat is the same as that of the electrode encompassed therein and the magnitude of the charge depends upon the distance of the particular portion of the pleat from the electrode. As can be seen in Fig. 2, all of the upstream facing pleats 14 which encompass the high voltage series of electrodes 12 have a high electrostatic potential induced thereon. All the upstream facing pleats 15 which encompass the ground electrodes 13 are at a low or ground potential.

The electrodes 12 and 13 are supported within opposite side walls 6 and 7 by a plurality of holes 16 formed in the side walls. As can be seen from Fig. 1, all the electrodes 12 in the first series of electrodes have end portions 17 which protrude a short distance through the side wall 6 and, similarly, all the electrodes 13 of the second series of electrodes have end portions 18 which protrude a short distance through the side wall 7. The protruding end portions 17 and 18 of the electrodes 12 and 13 respectively, are suitably connected to sources of electrical potential of differing magnitudes or polarities. Thus, as can be seen in Fig. 1, the end portion 17 of the electrodes 12 are all connected to the high voltage terminal 19 by the spring wire connector 21. All the end portions 18 of the series of electrodes 13 are connected by a similar spring wire connector 22 which is, in turn, connected to the ground terminal 23. The arrangement illustrated in the drawings for connecting the electrodes of the electrostatic filter to a source of electrical power, is fully described in my application Serial No. 599,200 filed July 20, 1956, now Patent No. 2,818,134, and assigned to the same assignee as the present invention. During the operation of the electrostatic filter the high voltage terminal 19 is in electrical connection with a suitable source of high voltage direct current and the low voltage terminal 23 is connected to ground.

Figure 4:
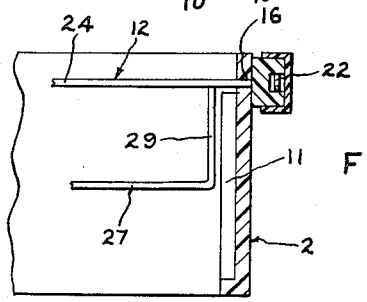
Fig. 4 is an elevation view taken along line 4—4 of Fig. 1 showing the arrangement and construction of the electrode elements and their supporting means within the frame member.
Figure 5:
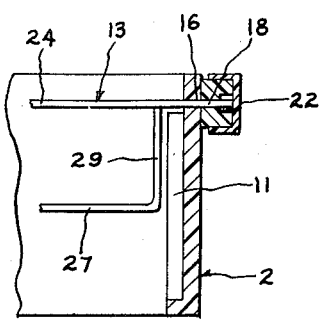
Fig. 5 is an elevational view taken along line 5—5 of Fig. 1 and illustrates the means by which the individual electrode members are connected to an electrical potential.

Referring now to Figs. 2, 4, and 5 it may be seen that the individual electrodes, according to one embodiment of the invention, comprise two spaced-apart parallel elements arranged within and completely encompassed by the upstream facing pleats of the filter media 8. More specifically, each of the electrodes includes a first or upstream element 24 which contains that end portion of the electrode which extends through the side wall and provides the means for connecting the electrode to a source of high or low voltage. It should be noted that all of the electrodes are constructed in the same manner except for the end portions 17 and 18 of the series 12 and 13, respectively, which extend through opposite side walls of the frame member. As may be seen in Fig. 2, the upstream element 24 of each electrode is disposed closely adjacent and parallel to the ridge 9 of the upstream facing pleat of the filter media. In fact, the upstream portion of the filter media may be partially supported upon the electrode elements 24. Disposed downstream from the electrode element 24 and electrically connected thereto is a second electrode element 27. As can be seen in Figs. 4 and 5, the electrode elements 27 are provided at both ends with a pair of spacer legs 29 which connect the element 27 rigidly to the elements 24 and maintain the elements in spaced apart relation. The ends of the legs 29 may be welded or brazed to the element 24 to provide a strong bond and good electrical connection.

It is obvious that the spacer legs 29 which maintain the electrode elements 27 rigidly and electrically connected to the elements 24 and spaced therefrom, are not the only means by which this can be accomplished. For example, the electrode element 27 could be supported within holes in the side walls in a manner similar to the electrodes elements 24 and they could have an end portion similar to the end portion 18 of the element 24 which extends through the sidewall of the frame 2. This extension of the element 27 would also be connected to the same source of voltage as is connected to the element 24. This would eliminate the need for the spacer legs 29 which are welded or brazed to the electrode element 24. It is only important that all of the electrode elements within each individual pleat of the filter media be connected to the same source of electrical potential or connected to electrical potentials of the same magnitude and polarity.

It should also be stated that hereinafter whenever the term "electrode" is used it is intended to include all of the electrode elements which are encompassed within a single upstream facing pleat of the filter media. The terms "element" or "electrode element" refer only to a single member which is electrically connected to the remaining "element" or "elements" within a single pleat to form an "electrode."

In the operation of the filter of the present invention, a moderately high charging or ionizing voltage is impressed upon the high voltage series of electrodes 12 and the low voltage series of electrodes 13 are at ground potential. An electrical field is set up in the air space between adjacent electrodes and an electrostatic charge is induced upon the dielectric fibrous material overlying the electrodes. The charge or potential of any particular point on the filter media 8 is dependent upon the relative position of this point with reference to the electrode elements within the upstream facing pleats. By virtue of the downstream electrode elements 27 there is an electrical charge induced upon the filter media in the areas adjacent these elements which charge is of substantially greater magnitude than if these electrode elements 27 were absent. For example, referring to Fig. 2, the charge induced upon the filter media at point 30 due to the electrode element 27a within the high voltage pleat 14 is much greater than would be induced by the single element 24 if the element 27a were absent. In other words by means of an electrode having an electrode element which is disposed near to the downstream portions of the pleat, in addition to the element adjacent the upstream ridges thereof, the intensity of the electrostatic charge upon the sides of these pleats in the downstream direction is greatly increased. It is the applicant's belief that the electrostatic charge on the filter media between upstream electrode elements 24 and the area of the filter media opposite the downstream electrode elements 27 is of substantially uniform intensity. It may vary slightly in intensity due to the different distances of the particular points on the filter media from the electrode elements 24 and 27, but for all practical purposes the intensity is substantially uniform on the filter media between these two points.

There is a potential gradient on the filter media in the area downstream from the elements 27 which gradually decreases from a high potential at the point 30 opposite the high potential electrode element 27a to ground potential at the point 31 opposite the low voltage electrode element 27b. The downstream facing ridge 10 may be described as having a potential which is about half way between the high potential of the element 27a and the ground potential of the electrode element 27b. In other words, it may be said that the entire side 34 which is closer to the ground electrode 13 is at a lower potential than the side 33 which is closer to the high potential electrode 12, although it is to be understood that there is a gradually decreasing potential gradient starting about the point 30 opposite the high voltage element 27a to the point 31 opposite the low voltage element 27b. As a result of the fact that the various areas of the filter media are charged at different potentials, attractive forces are set up between the opposed sides 33 and 34 which cause unattached particles on one side to be attracted across the space between these sides onto the other side whereupon it assumes the charge of the other side.

Figure 3:
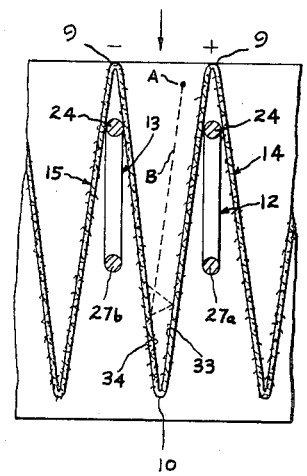
Fig. 3 is an enlarged view showing a portion of the filter structure of Fig. 2 in greater detail.

The manner in which an electrostatically charged filter of this type operates to remove suspended dust particles from a moving gas stream, is described in my previously mentioned application 534,250 and, although the improvements as described in this application increase the efficiency of the device, it is the applicant's belief that the theory of operation is basically the same. This theory of operation may best be illustrated with reference to Fig. 3 which shows an enlarged cross section of a portion of the filter of Fig. 2. It is the applicant's belief that as suspended particles, such as the particle A of Fig. 3, are brought into the high intensity field between adjacent folds of the filter media, each particle is charged at a potential depending upon its position in the field relative to the oppositely charged electrodes 12 and 13. The induced charge causes the particle which is still moving forwardly with the gas stream, to be attracted to a point within the filter of opposite potential or charge. Thus particle A moving into the filter at a point adjacent the high potential electrode 12 assumes a charge similar in magnitude and polarity to that of the high potential electrode 12. The charged particle is thereafter deflected away from the high potential electrode 12 and towards an area or portion of the filter of opposite polarity or lower potential. The path of the particle A, for example, may follow that generally indicated by the dotted line B to a point on the side 34 in the low potential pleat 15 encompassing the ground electrode 13. At this point the particle will either become inmeshed or anchored in the fibrous structure of the filter media and permanently held there or it will immediately take on the same potential as that point on the side 34 and be attracted to the high potential side 33 of the high potential pleat 14. If this is the case, the particle in its transition from the side 34 of pleat 15 to the side 33 of pleat 14 will be under the influence of not only the forwardly moving gas stream but also the electrical field between the adjacent sides 33 and 34 or between adjacent electrodes 12 and 13. The moving gas stream tends to force the particle downwardly toward to downstream ridge 10 while the electrical field, which is highest in the upstream portion of the filter, tends to attract the particle toward the higher intensity area. As a result, the particle moves laterally across and somewhat upstream between the sides 34 until it contacts the side 33 where it assumes the same charge as this point on the side 33 of the high potential fold 14. Here unless the particle is captured and permanently held on the surface of the filter media or within the fibrous structure the process is repeated.

The effect of the present invention upon the operation of the filter appears to be this. As the particle enters the electrical field set up between the adjacent electrodes 12 and 13 it is under the influence of a field of high intensity for a longer period of time than is the case where there is only a single element within each upstream facing pleat. That is, the particles must pass through a high intensity field for a greater distance and thereby become ionized or charged to a much greater extent. Once charged, the particles appear to be subjected to repelling and attracting forces of greater magnitude for a further distance toward the downstream portions of the filter media, which forces cause the particles to move back and forth across the space between the upstream facing pleats of the filter media until they become imbedded or permanently held therein. At any rate, regardless of the theory of operation, experiment has shown that a filter using the electrode construction of the present invention to induce the electrostatic charge upon the filter media has a greater degree of efficiency than where only a single electrode element is used to produce the charge.

Figure 6:
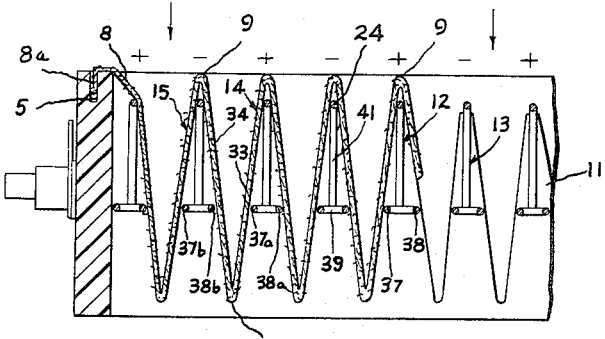
Fig. 6 is a cross-sectional view similar to Fig. 2 showing another embodiment of the present invention.

Referring now to Fig. 6, there is shown a second embodiment of the present invention in which the same numerals are used to indicate components of the filter which are similar to those of the first embodiment illustrated in Figs. 1–5. The electrode members of Fig. 6 comprise a plurality of electrode elements arranged across the filter frame 2, downstream from the filter media 8, each electrode being encompassed within one of the upstream facing pleats of the filter media 8. These electrode elements are arranged in triangular fashion within the individual pleats of the filter media. Thus, as is shown in Fig. 6, there are three electrode elements 24, 37 and 38 arranged within each upstream facing pleat, with element 24, which forms the apex of the triangle, parallel to and closely adjacent the ridge 9 of the pleat. Element 37 and 38 are disposed downstream from the element 24 and are arranged closely adjacent opposite sides of the individual pleats of the filter media. More specifically, element 37 is closely adjacent side 33 which is the left hand side of each pleat as seen in Fig. 6, and element 38 lies closely adjacent the right hand side 34 of each pleat. Elements 37 and 38 are held in rigid spaced-apart relation by spacer arms 39 which also serve to connect the elements 37 and 38 electrically. Spacer legs 41 are provided which extend between the upstream element and the spacer arm 39 and maintain the proper spacing therebetween. The spacer legs 41 depend downwardly in Fig. 6 from their weld or connection to the element 24 are rigidly connected by welding, brazing or other means well known in the art to the spacer arm 39 extending between the elements 37 and 38. The members 24 of this embodiment of the invention also are provided with end portions (similar to end portions 17 and 18 of the first embodiment illustrated in Figs. 1–5) which extend or protrude through the opposite side walls of the frame member and are thereby connected to sources of electrical potential of differing magnitudes or polarities. Thus, when the filter is in operation, an electrical potential of the same magnitude is impressed upon all of the electrode elements within one upstream pleat of the filter media while, in the adjacent upstream facing pleat of the filter media, the electrode elements all have an impressed voltage of a different magnitude or polarity.

By virtue of the proximity of the electrode elements 37 and 38 to the opposite sides 33 and 34 of the individual pleats of the filter media, there is induced upon the sides 33 and 34 an electrostatic charge which is of substantially uniform density in the areas on these two sides between the upstream electrode element 24 and the downstream elements 37 and 38. Furthermore, as in the previous embodiment, there is a potential gradient between adjacent upstream facing pleats with the downstream facing ridges 10 have an electrostatic potential, the magnitude of which is about half way between that of the charge induced upon the upper portions of the high potential pleats 14 and the ground or low potential pleats 15. In this embodiment, with the downstream elements 37 and 38 much nearer the filter media, the electrostatic charge induced upon the filter media 8 is slightly higher for a particular electrode voltage than is the case in the first embodiment. However, in this embodiment the spacing between the downstream elements of adjacent folds becomes much less and there is a greater chance of sparking between adjacent electrodes.

In order to increase the spacing between downstream elements within adjacent pleats it is preferable to stagger the position of these downstream elements. Thus, as may be seen in Figs. 7 and 8 all of the elements 38 which are arranged closely adjacent the right hand sides 34 of the upstream facing pleats are disposed in one plane, and all of the elements 37 closely adjacent the left hand sides 33 of these pleats are disposed in a second plane slightly downstream from the first plane. In this variation of the invention the electrodes 37 and 38 are rigidly and electrically connected by the spacer arm 39 which is canted at an angle. In this manner, adjacent downstream electrode elements within adjacent pleats, such as elements 37a and 38b in Fig. 7, can be spaced sufficiently to prevent electrical sparking therebetween. At least, it is possible to space the elements, such as elements 37a and 38b of adjacent electrodes, farther apart than if they are all arranged in a single plane.

Figure 7:
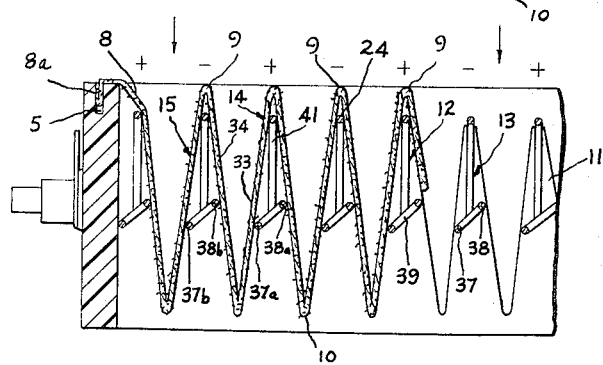
Fig. 7 is a cross-sectional elevation view similar to Fig. 6 and showing a slightly varied arrangement of the embodiment of the invention of Fig. 6.

Comparison tests have been made to show the efficiency of the filters illustrated by Figs. 2 and 7 in relation to a filter having only a single electrode element lying closely adjacent the upstream ridge of the pleat. These tests were made to determine the efficiency of the filters in removing very small particles having a size of .005 micron or less from a gas stream. The following table shows the average results of these tests in terms of percentage of efficiency. It should be understood that these percentage efficiencies in the table apply only to those particles having a size of .005 micron or less. The percentage efficiency of these filters in removing smoke, dust, or fume particles of approximately a micron diameter or larger from a gas stream is extremely high. The tests were made using a filter having a 12" x 12" cross section through which 300 cubic feet of air was passed per minute. All of the filters used during the tests were constructed in a similar manner from five layers of No. 202 paper and had a pleat length of 1¾" while the spacing between adjacent ridges was ½". For the tests tabulated below, voltage differentials of 3000 and 5000 volts were impressed across the electrodes. That is, for one test a high potential source of direct current of 3000 volts was connected to the high voltage terminal while the low voltage terminal was connected to ground. A second test was made with the high voltage terminal and electrodes 12 at 5000 volts, and the low voltage electrodes 13 at ground. By means of a Condensation Nuclei Counter it was possible to obtain readings from samples of the air stream both upstream and downstream from the filter showing the number of particles below .005 micron per unit volume of air. The difference in these two readings divided by the reading obtained in the upstream area expressed as a percentage is the cleaning efficiency of the filter in removing this size particles, the averages of which are illustrated in the following table:

| Electrode Construction | Voltage Differential Between Adjacent Electrodes | Percent Cleaning Efficiency in Removing .005 Micron or Smaller Particles |
| --- | --- | --- |
| Single Element Electrodes: (Element adjacent upstream ridge)_ | 3,000 | 7.1 |
| Do | 5,000 | 8.3 |
| Double Element Electrode: (Fig. 2 type with downstream element ½" from upstream ridge)__ | 3,000 | 6.2 |
| Do | 5,000 | 6.7 |
| Double Element Electrode: (Fig. 2 type with downstream element 13⁄16 from upstream ridge)_ | 3,000 | 11 |
| Do | 5,000 | 12.5 |
| Triple Element Electrode: (Fig. 7 type) | 3,000 | 11.8 |
| Do | 5,000 | 14.5 |

As can be seen by the above table, in removing particles of .005 micron diameter size or less from a gas stream, an electrode construction similar to that shown in Fig. 2 with the downstream element 27 spaced 13⁄16" from the upstream ridge showed an improvement of 50 to 55% over the gas cleaning efficiency of the filter using the single electrode element construction. It should also be pointed out that when the downstream electrode 27 was spaced only ½" from the upstream ridge, the cleaning efficiency was actually less than that of the filter using the single electrode element. Further testing also indicated, although not included as a part of the above table, when the second or downstream electrode element 27 was positioned in the farther downstream portions of the pleat the gas cleaning efficiency dropped off very substantially and actually gave results below that of the filter with the single electrode element. It has been determined through test results that the greatest efficiency is obtained when the downstream element 27 is positioned not less than 40% of the length of the individual pleat and not more than 60% of the length of the pleat away from the upstream ridge of the pleat. The length of the pleat being the distance between an upstream ridge and a point half way between two adjacent downstream ridges. Best results were obtained when the downstream element was approximately half way down the pleat from the upstream ridge.

The above table also shows that the filter using an electrode construction similar to that of Fig. 7 has a gas cleaning efficiency much greater than a filter using a single electrode element. In fact, this electrode construction showed a slightly higher efficiency than that of the type illustrated in Fig. 2. In the filter of the type illustrated by Fig. 7 and used in the tests, all of the downstream electrode elements were positioned within the space included between 40% and 60% of the length of the pleats.

Only the results of the filters using the two voltages 300 v. and 5000 v. are shown in the table. As the voltages were increased the percentage efficiency of all of the filters increased accordingly. At 8000 volts the filter using the electrode construction of Fig. 7 gave a gas cleaning efficiency of 22% in removing particles below the .005 micron size. It will be evident from the above table, that a device of this kind used in an air purifier or conditioner which recirculates air within an enclosure at the rate of approximately 300 C. F. M. substantially eliminates all of these very small particles in a very short period.

Figure 8:
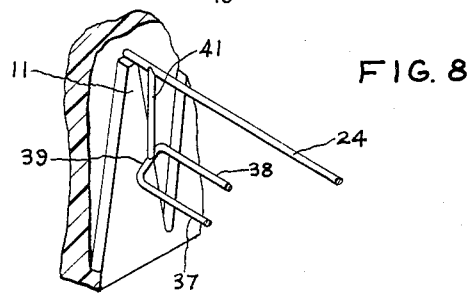
Fig. 8 is a partial perspective view of the arrangement of the elements of the electrodes illustrated in the embodiment of Fig. 7.

One advantage of the embodiment shown in Figs. 6, 7 and 8, in addition to the increased electrostatic charge induced upon the filter media 8, due to the close proximity of the downstream elements thereto, is that the filter media 8 is reinforced or braced against the pressure of the air stream flowing therethrough. As the filter media is made of a more or less flexible or loosely matted paper, the pressure of the air stream tends to cause the sides of the pleats to bow inwardly if the paper is not properly reinforced, and this in turn results in a substantial pressure loss in the filter media. By arranging the downstream electrodes closely adjacent the sides of the filter media, they provide the support necessary to prevent the upstream facing pleats from collapsing inwardly thereby permitting increased flow of air through the filter.

By the present invention there has been provided an electrostatic filter having an electrode construction designed to induce an electrostatic charge upon an accordion-folded filter media, which charge is of substantially uniform high intensity and is maintained for a substantial distance down the upstream facing pleats of the filter media. Furthermore, the electrodes of the present invention provide a reinforcing structure within the upstream facing pleats of the filter media to prevent the collapsing of these pleats against the pressure of the air stream flowing through the filter.

While in accordance with the patent statutes there has been described what at present is considered to be the preferred embodiments of this invention, it will be obvious to those skilled in the art that various changes and modifications may be made therein without departing from the invention and it is, therefore, the aim of the appended claims to cover all such changes and modifications, as fall within the true spirit and scope of the invention.

What I claim as new and desire to secure by Letters Patent of the United States is:

1. An electrostatic filter for filtering particles from a gas stream comprising an accordion folded filter media of dielectric fibrous material extending across the path of said gas stream with the ridges thereof alternately facing upstream and downstream, said media thereby forming a plurality of upstream facing pleats bounded by said downstream ridges, means to establish and maintain an electrostatic potential difference between adjacent upstream facing pleats of said filter media comprising a plurality of electrodes on the downstream side of said filter media, each of said electrodes arranged within one of said upstream facing pleats of said filter media, said electrodes each including three spaced apart conducting elements, one of said elements being disposed closely adjacent and parallel to said upstream facing ridge, said remaining two elements disposed downstream from said one element and electrically connected thereto, each of said remaining elements lying closely adjacent opposite sides of said pleat, and means for charging adjacent electrodes to different electrostatic potentials.

2. An electrostatic filter for filtering particles from a gas stream comprising an accordion folded filter media of dielectric fibrous material extending across the path of said gas stream with the ridges thereof alternately facing upstream and downstream, said media thereby forming a plurality of upstream facing pleats each bounded by two adjacent downstream ridges, means to establish and maintain an electrostatic potential difference between adjacent upstream facing pleats of said filter media comprising a plurality of electrodes on the downstream side of said filter media, each of said electrodes encompassed within one of said upstream facing pleats of said filter media, each of said electrodes including three spaced apart conducting elements, one of said elements being disposed closely adjacent and parallel to said upstream ridge of said pleat, said remaining elements arranged parallel to said one element and disposed downstream therefrom, each of said downstream elements arranged closely adjacent opposite sides of said individual pleat, all of said downstream elements closely adjacent the same side of said individual pleats arranged to lie in a first plane perpendicular to said gas stream, all of said downstream electrodes adjacent the other side of said individual pleats arranged to lie in a second plane downstream from said first plane, all of said elements encompassed within a single of said upstream facing pleats being electrically connected, and means for charging adjacent electrodes to different electrostatic potentials.

3. An electrostatic filter for filtering particles from a gas stream comprising an accordion folded filter media of dielectric fibrous material extending across the path of said gas stream with the ridges thereof alternately facing upstream and downstream, said media thereby forming a plurality of upstream facing pleats each bounded by two adjacent downstream ridges, means to establish and maintain an electrostatic potential difference between adjacent upstream pleats of said filter media comprising a plurality of electrodes on the downstream side of said filter media, each of said electrodes arranged within one of said upstream facing pleats of said filter media, each of said electrodes including three spaced apart conducting elements, said elements disposed in substantially triangular fashion within said upstream facing pleats of said filter media with one of said elements of each of said electrodes being disposed closely adjacent and parallel to said upstream ridges of said pleats, said remaining elements arranged parallel to said one element and disposed downstream therefrom, said downstream elements within each of said upstream facing pleats arranged closely adjacent opposite sides thereof, all of said downstream elements closely adjacent the same side of said individual pleats arranged to lie in a first plane perpendicular to said gas stream, all of said downstream elements adjacent said other side of said individual pleats arranged to lie in a second plane perpendicular to said gas stream, all of said elements within a single pleat being electrically connected, and means for connecting alternate electrodes to a source of high voltage and means to connect intermediate of said electrodes to a source of ground potential.

4. An electrostatic filter for filtering particles from a gas stream comprising an accordion folded filter media of dielectric fibrous material extending across the path of said gas stream with the ridges thereof alternately facing upstream and downstream, said media thereby forming a plurality of upstream facing plates each bounded by two adjacent downstream facing ridges, means to establish and maintain an electrostatic potential difference between adjacent upstream facing pleats of said filter media comprising a plurality of electrodes on the downstream side of said filter media, each of said electrodes arranged within one of said upstream facing pleats of said filter media, each of said electrodes including three spaced apart conducting elements, said elements disposed in substantially triangular fashion within said upstream facing pleats of said filter media with one of said elements of each of said electrodes being disposed closely adjacent and parallel to said upstream ridges of said pleats, said remaining elements arranged parallel to said one element and disposed downstream therefrom, said downstream elements within each of said upstream facing pleats arranged closely adjacent opposite sides thereof, all of said downstream elements closely adjacent the same side of said individual pleats arranged to lie in a first plane perpendicular to said gas stream, all of said downstream elements adjacent the other side of said individual pleats arranged to lie in a second plane perpendicular to said gas stream, all of said downstream elements disposed a distance greater than 40% of the length of said individual pleats and not greater than 60% of the length of the pleats from said upstream facing ridges, all of said elements within a single pleat being at the same electrical potential and means for connecting alternate electrodes to a source of high voltage and means to connect intermediate said electrodes to a source of ground potential.

References Cited in the file of this patent

UNITED STATES PATENTS

| | | |
|---|---|---|
| 2,297,601 | Williams | Sept. 29, 1942 |
| 2,735,509 | Fields | Feb. 21, 1956 |
| 2,814,355 | Powers | Nov. 26, 1957 |